United States Patent
Kim et al.

(10) Patent No.: US 8,520,600 B2
(45) Date of Patent: Aug. 27, 2013

(54) METHOD OF TRANSMITTING CHANNEL QUALITY INFORMATION OF DOWNLINK MULTI CARRIERS IN A WIRELESS COMMUNICATION SYSTEM

(75) Inventors: Ki Hwan Kim, Anyang-si (KR); Hyun Soo Ko, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 13/143,914

(22) PCT Filed: Aug. 20, 2009

(86) PCT No.: PCT/KR2009/004641
§ 371 (c)(1),
(2), (4) Date: Jul. 8, 2011

(87) PCT Pub. No.: WO2010/098520
PCT Pub. Date: Sep. 2, 2010

(65) Prior Publication Data
US 2011/0299467 A1    Dec. 8, 2011

Related U.S. Application Data

(60) Provisional application No. 61/156,312, filed on Feb. 27, 2009.

(30) Foreign Application Priority Data

Jun. 5, 2009    (KR) .................. 10-2009-0049810

(51) Int. Cl.
*H04L 12/28*    (2006.01)

(52) U.S. Cl.
USPC ........................................ 370/328

(58) Field of Classification Search
None
See application file for complete search history.

(56) References Cited

U.S. PATENT DOCUMENTS

| 2008/0311919 A1* | 12/2008 | Whinnett et al. ............. 455/447 |
| 2009/0052405 A1 | 2/2009 | Ko et al. |
| 2010/0015923 A1* | 1/2010 | Golitschek .................. 455/67.7 |

FOREIGN PATENT DOCUMENTS

| EP | 1699197 | 9/2006 |
| EP | 1786133 | 5/2007 |
| EP | 1906577 | 4/2008 |

* cited by examiner

*Primary Examiner* — John Blanton
(74) *Attorney, Agent, or Firm* — Lee, Hong, Degerman, Kang & Waimey

(57) ABSTRACT

A method of transmitting channel quality information in a wireless communication system is disclosed. The method of transmitting channel quality information from a mobile station in a wireless communication system includes generating channel quality information of a downlink multi carrier including N number of downlink component carriers; and transmitting the generated channel quality information to a base station through at least one of a physical uplink control channel (PUCCH) a physical uplink shared channel (PUSCH) on a single uplink component carrier.

4 Claims, 9 Drawing Sheets

METHOD OF TRANSMITTING CHANNEL QUALITY INFORMATION OF DOWNLINK MULTI CARRIERS IN A WIRELESS COMMUNICATION SYSTEM

CROSS-REFERENCE TO RELATED APPLICATIONS

This application is the National Stage filing under 35 U.S.C. 371 of International Application No. PCT/KR2009/004641, filed on Aug. 20, 2009, which claims the benefit of earlier filing date and right of priority to Korean Application No. 10-2009-0049810, filed on Jun. 5, 2009, and also claims the benefit of U.S. Provisional Application Ser. No. 61/156,312, filed on Feb. 27, 2009, the contents of all of which are incorporated by reference herein in their entirety.

TECHNICAL FIELD

The present invention relates to a wireless communication system, and more particularly to, a method of transmitting channel quality information of downlink multi carriers in a wireless communication system.

BACKGROUND ART

For efficient communication, a receiver should feed back channel information to a transmitter. Generally, a mobile station transmits channel information of a downlink to a base station through an uplink while the base station transmits channel information of the uplink to the mobile station through the downlink. This channel information will be referred to as a channel quality indicator (CQI). The channel quality indicator can be generated by various methods.

FIG. 1 is a diagram illustrating generation and transmission of a channel quality indicator.

The mobile station measures quality of a downlink channel and reports a channel quality indicator value selected based on the measured quality to the base station through a control channel. The base station performs downlink scheduling (selection of mobile station, resource allocation, etc.) in accordance with the reported channel quality indicator.

In other words, when the base station allocates a radio resource to the mobile station in a wireless communication system, the base station uses the channel quality indicator received from the mobile station.

The mobile station measures channel quality information such as signal to interference ratio (SIR) by receiving a pilot channel from the base station and reports the measured channel quality information to the base station. Then, the base station allocates the radio resource to each of the mobile stations using the channel quality information received from each of the mobile stations.

The mobile station can report the channel quality information to the base station periodically or non-periodically. The mobile station can report the channel quality information to the base station through a physical uplink control channel (PUCCH) or a physical uplink shared channel (PUSCH). The physical uplink control channel and the physical uplink shared channel use their respective coding method, and decoding performance of the physical uplink shared channel is more excellent than that of the physical uplink control channel.

In view of time and frequency used by the mobile station to report channel quality information, resources are controlled by the base station, and the channel quality information can be transmitted to the base station periodically or non-periodically. Supposing that the channel quality information periodically reported from the mobile station to the base station is referred to as periodic CQI information and the channel quality information non-periodically reported from the mobile station to the base station is referred to as aperiodic CQI information, physical channels through which the periodic CQI information and the aperiodic CQI information are transmitted in accordance with a scheduling mode in a long term evolution (LTE) system will be expressed by Table 1 below.

TABLE 1

| Scheduling mode | Periodic CQI information report channel | Aperiodic CQI information report channel |
| --- | --- | --- |
| Frequency non-selective | PUCCH | — |
| Frequency selective | PUCCH | PUSCH |

Meanwhile, the physical channels through which periodic CQI and aperiodic CQI are transmitted in accordance with the scheduling mode in the LTE system will be described in more detail as follows.

1. The mobile station is requested periodic CQI information from the base station, and configures PUCCH-based periodic CQI information if the PUSCH is not allocated thereto at the timing when the periodic CQI information should be transmitted and transmits the configured periodic CQI information using the PUCCH.

2. The mobile station is requested periodic CQI information from the base station, and configures PUSCH-based aperiodic CQI information if aperiodic CQI information is requested from the base station at the timing when the periodic CQI information should be transmitted and transmits the aperiodic CQI information using the PUSCH. However, data cannot be transmitted to the PUSCH.

3. If aperiodic CQI information is requested from the base station, the mobile station configures PUSCH-based aperiodic CQI information and transmits the CQI information using the PUSCH. However, data cannot be transmitted to the PUSCH.

4. The mobile station is requested periodic CQI information from the base station, and if the mobile station uses the PUSCH to transmit uplink data at the timing when the periodic CQI information should be transmitted, the mobile station configures PUCCH-based periodic CQI information, multiplexes the configured PUCCH-based periodic CQI information with uplink data, and then transmits the multiplexed data using the PUSCH.

To transmit control information more than the amount of information that can be transmitted through the physical uplink control channel or improve transmission performance of the control information, the mobile station transmits the channel quality information to the base station through the physical uplink shared channel. According to the related art, the mobile station can transmit the channel quality information to the base station through the physical uplink shared channel only if there is any grant of the base station.

A 3GPP LTE ($3^{rd}$ generation partnership project long term evolution) system supports a system bandwidth of 1.25 MHz to maximum 20 MHz. Accordingly, a method of transmitting channel quality information according to the related art describes a method of transmitting channel quality information corresponding to a bandwidth of 20 MHz.

However, a long term evolution-advanced (LTE-A) system supports a bandwidth of 100 MHz comprised of five bandwidths of 20 MHz through carrier aggregation. Accordingly, a method of transmitting channel quality information corresponding to a bandwidth of 100 MHz will be required.

DISCLOSURE

Technical Problem

As described above, although the related art describes a method of transmitting channel quality information corresponding to a bandwidth of 20 MHz, since a new system supports a multicarrier bandwidth of 100 MHz, a method of transmitting channel quality information corresponding to a multicarrier bandwidth is required.

An object of the present invention is to provide a method of transmitting channel quality information corresponding to a multicarrier bandwidth.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

In one aspect of the present invention, a method of transmitting channel quality information from a mobile station in a wireless communication system comprises generating channel quality information of a downlink multi carrier including N number of downlink component carriers; and transmitting the generated channel quality information to a base station through at least one of a physical uplink control channel (PUCCH) and a physical uplink shared channel (PUSCH) on a single uplink component carrier.

Preferably, the channel quality information may be periodically transmitted, and be transmitted through the N number of PUCCHs or less on the single uplink component carrier if the PUSCH is not allocated at the time when the channel quality information should be transmitted.

Preferably, the method may further include multiplexing data, wherein the channel quality information may be periodically transmitted, and when the time when the channel quality information is transmitted conforms to the time when the data is transmitted, the channel quality information may be transmitted through the N number of PUCCHs or less and the data may be transmitted through the PUSCH.

Preferably, the channel quality information may be periodically transmitted, and when the number of PUCCHs in which are usable the single uplink component carrier is limited to M(<N) number, channel quality information of the M number of downlink component carriers is transmitted through the M number of PUCCHs and channel quality information of N-M number of downlink component carriers is transmitted through the PUSCH.

Preferably, the channel quality information may include periodically transmitted channel quality information and non-periodically transmitted channel quality information, the periodically transmitted channel quality information being configured based on the PUCCH, and the non-periodically transmitted channel quality information being configured based on the PUSCH, and when the time when the periodically transmitted channel quality information is transmitted conforms to the time when the non-periodically transmitted channel quality information is transmitted, the periodically transmitted channel quality information may be transmitted through the N number of PUCCHs or less and the non-periodically transmitted channel quality information may be transmitted through the PUSCH.

The method may further include multiplexing data, wherein the channel quality information may be periodically transmitted channel quality information, the number of PUCCHs which are usable in the single uplink component carrier may be limited to M(<N) number, and when the time when the channel quality information is transmitted conforms to the time when the data is transmitted, channel quality information of the M number of downlink component carriers may be transmitted through the M number of PUCCHs and channel quality information of N-M number of downlink component carriers may be multiplexed with the data and then transmitted through the PUSCH.

Preferably, the channel quality information may be periodically transmitted channel quality information, and may include first channel quality information and second channel quality information, the first channel quality information may be transmitted through the PUCCH and the second channel quality information may be transmitted through the PUSCH and an amount of the first channel quality information may be larger than the second channel quality information.

Preferably, the first channel quality information may be a channel quality indicator information and the second channel information may be a channel matrix H between the mobile station and the base station.

Advantageous Effects

According to the embodiments of the present invention, channel quality information corresponding to a multicarrier bandwidth can be transmitted, and the method of transmitting channel quality information can be applied to even the case where the number of component carriers of a downlink is different from that of an uplink.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings, so that a person with an ordinary skill in the art to which the present invention pertains can easily carry out the embodiments. However, it is to be understood that various modifications can be made in the present invention and the present invention is not limited to the following description. In order to clarify the present invention, parts which are not related with the description will be omitted from the drawings, and wherever possible, the same reference numbers will be used throughout the drawings to refer to the same or like parts.

In the description, when some part "includes" some elements, it means that the part can further include other elements unless mentioned to the contrary. Also, terminologies " . . . part," " . . . block," " . . . module" described herein mean a unit processing at least one function or operation, and can be implemented by hardware, software or combination of hardware and software.

Hereinafter, a method of measuring channel quality information in a multicarrier system in accordance with the embodiment of the present invention will be described with reference to FIG. 2 to FIG. 9.

Figure 1:
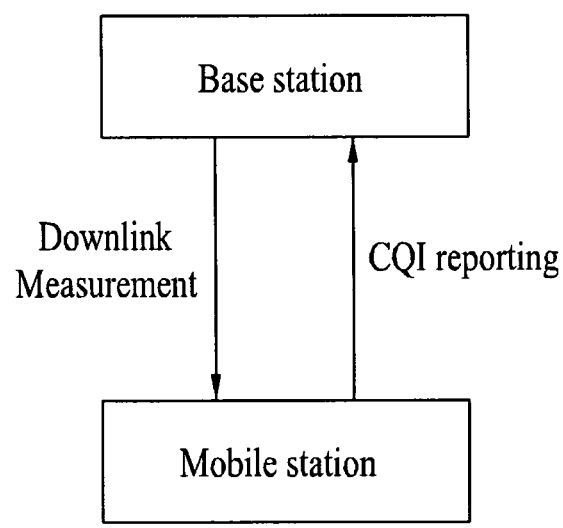
FIG. 1 is a diagram illustrating generation and transmission of a channel quality indicator.
Figure 2:
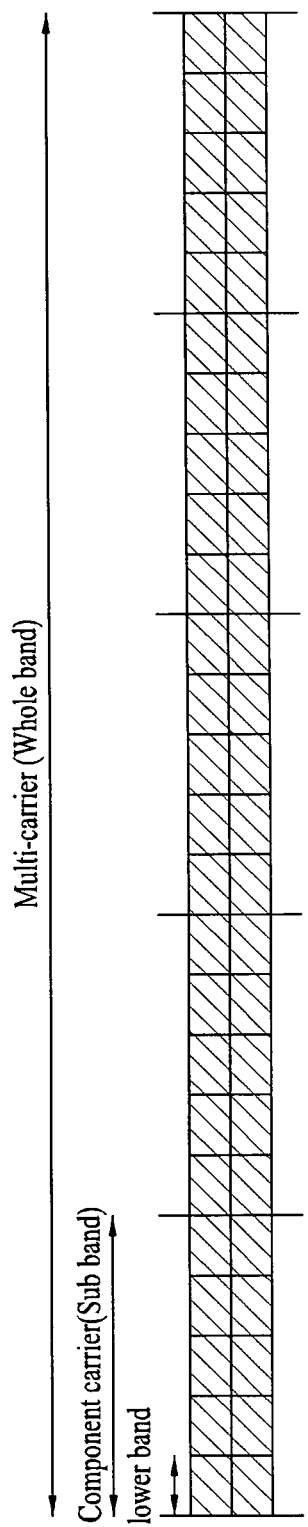
FIG. 2 is a diagram illustrating multi carriers in a method of transmitting channel quality information in accordance with one embodiment of the present invention.

FIG. 2 is a diagram illustrating multi carriers in a method of transmitting channel quality information in accordance with one embodiment of the present invention.

Referring to FIG. 2, multi carriers indicate a total of frequency bands used by a base station, and mean a whole band. For example, in an LTE-A system, multi carriers have a bandwidth of 100 MHz.

A component carrier (CC) constitutes multi carriers. A plurality of component carriers constitutes the multi carriers through carrier aggregation. The component carrier includes a plurality of lower bands. At this time, if the terminology, multi carriers, is replaced with a whole band, the component carrier can be replaced with a sub band, and a lower band can be replaced with a partial band. Also, the carrier aggregation may be referred to as a bandwidth aggregation.

Carrier aggregation means that a bandwidth is extended by collecting a plurality of carriers to enhance a data rate. For example, in the LTE system, one carrier has a bandwidth of 20 MHz. On the other hand, in the LTE-A system, five carriers of 20 MHz constitute a bandwidth of 100 MHz. In this way, the bandwidth can be extended to 100 MHz. Carrier aggregation can include aggregation of carriers located in different frequency bands.

Meanwhile, periodic CQI information is a means for periodically requesting control information from a base station to a mobile station. A mobile station established to periodically transmit CQI information to an uplink transmits periodically the CQI information to a specific subframe.

Aperiodic CQI information is triggered with an uplink scheduling grant signal transmitted from the base station to the mobile station through a physical downlink control channel (PDCCH), and then is transmitted to the uplink. In this case, various kinds of information such as a specific frequency in a PUSCH region and transmitted resource blocks are reported to the mobile station through the uplink scheduling grant signal so that the mobile station transmits data or aperiodic CQI information.

Hereinafter, in transmitting channel quality information (for example, periodic CQI information or aperiodic CQI information) corresponding to a plurality of downlink component carriers based on the aforementioned description, a structure of an uplink component carrier for transmitting the channel quality information will be described.

Figure 3:
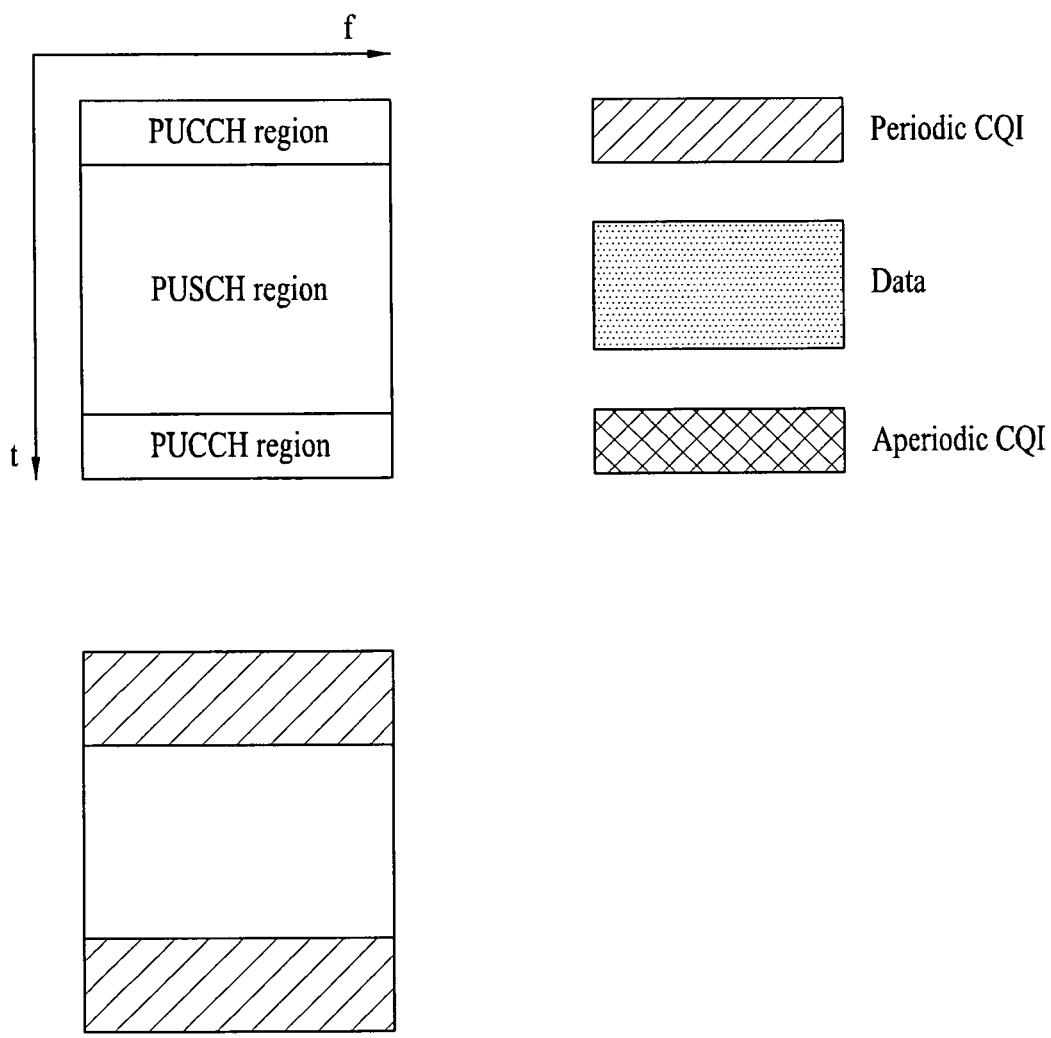
FIG. 3 is a diagram illustrating a structure of an uplink component carrier that transmits periodic CQI information in a multicarrier system according to one embodiment of the present invention.

FIG. 3 is a diagram illustrating a structure of an uplink component carrier (UL CC) that transmits periodic CQI information in a multicarrier system according to one embodiment of the present invention. As illustrated in FIG. 3, the UL CC includes a PUSCH region and a PUCCH region. In FIG. 3, the mobile station is requested periodic CQI information from the base station, and configures PUCCH-based periodic CQI information if a PUSCH is not allocated thereto at the timing when the periodic CQI information should be transmitted, and transmits the configured CQI information using one or more PUCCHs.

In this case, one PUCCH includes periodic CQI information of one downlink component carrier (DL CC) to have a structure compatible with the existing LTE system, or includes periodic CQI information of one or more DL CCs by extending the amount of information that can be allocated to one PUCCH. It is assumed that one PUCCH includes periodic CQI information of one DL CC. In this case, if N number of PUCCHs are used in one UL CC, it can mean that the base station requests periodic CQI information of N number of DL CCs once.

Figure 4:
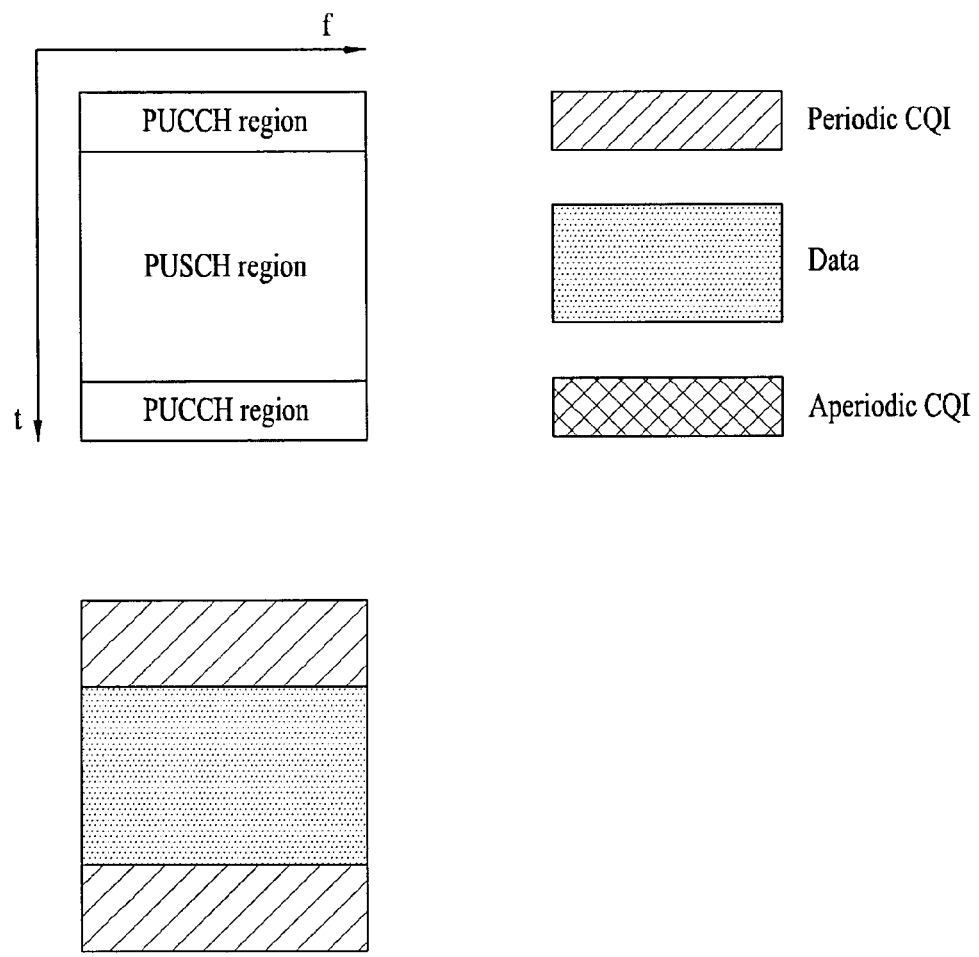
FIG. 4 is a diagram illustrating a structure of an uplink component carrier that transmits periodic CQI information and data in a multicarrier system according to one embodiment of the present invention.

FIG. 4 is a diagram illustrating a structure of an uplink component carrier that transmits periodic CQI information and data in a multicarrier system according to one embodiment of the present invention. As illustrated in FIG. 4, the mobile station is requested periodic CQI information from the base station, and configures PUCCH-based periodic CQI information if a PUSCH is not allocated thereto at the timing when the periodic CQI information should be transmitted, and transmits the configured CQI information using one or more PUCCHs. If the PUSCH is allocated from the base station to the mobile station to transmit uplink data, the mobile station can transmit the uplink data using the PUSCH.

In this case, one PUCCH includes periodic CQI information of one downlink component carrier (DL CC) to have a structure compatible with the existing LTE system, or includes periodic CQI information of one or more DL CCs by extending the amount of information that can be allocated to one PUCCH. It is assumed that one PUCCH includes periodic CQI information of one DL CC. In this case, if N number of PUCCHs are used in one UL CC, it can mean that the base station requests periodic CQI information of N number of DL CCs once.

Figure 5:
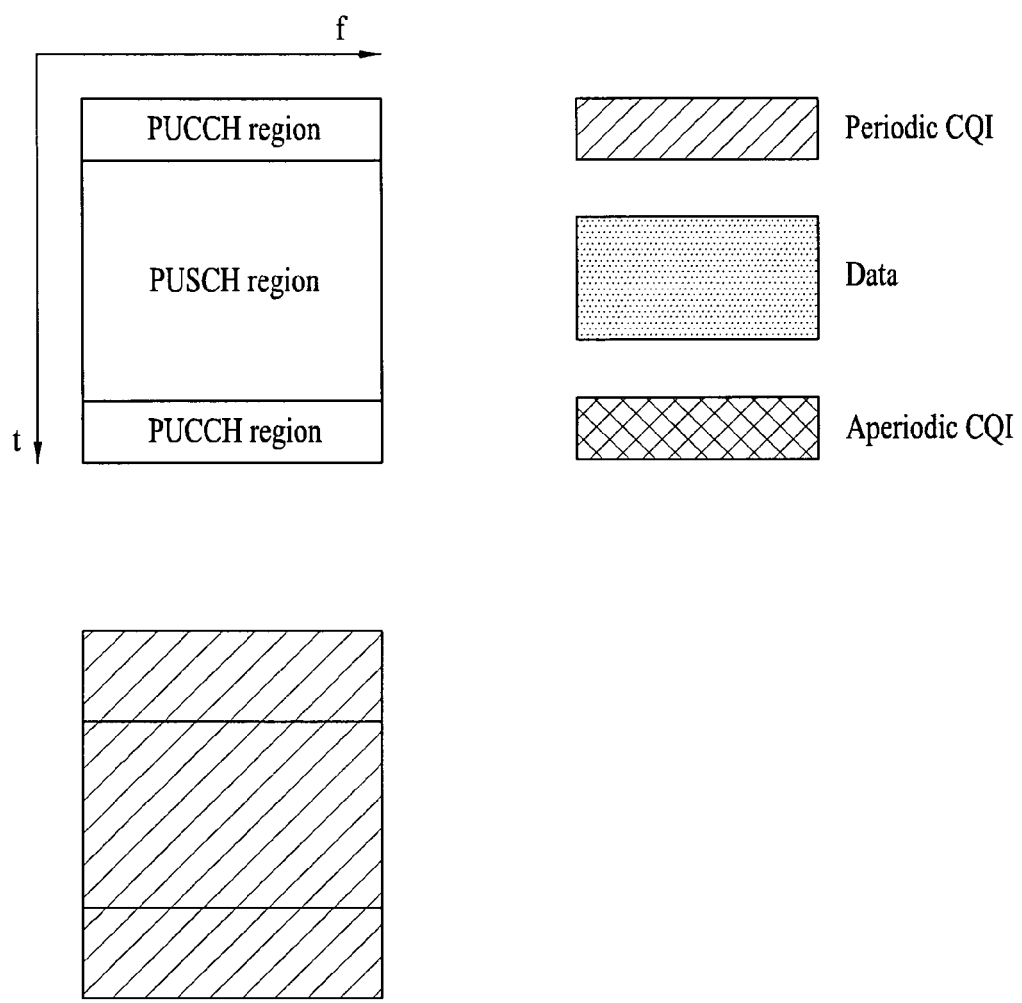
FIG. 5 is a diagram illustrating a structure of an uplink component carrier that transmits periodic CQI information in a multicarrier system according to another embodiment of the present invention.

FIG. 5 is a diagram illustrating a structure of an uplink component carrier that transmits periodic CQI information in a multicarrier system according to another embodiment of the present invention. As illustrated in FIG. 5, the mobile station is requested periodic CQI information from the base station, and configures PUCCH-based periodic CQI information if a PUCCH and a PUSCH for periodic CQI transmission are allocated thereto at the timing when the periodic CQI information should be transmitted, and transmits the configured CQI information using the PUSCH and one or more PUCCHs.

In this case, one PUCCH includes periodic CQI information of one downlink component carrier (DL CC) to have a structure compatible with the existing LTE system, or includes periodic CQI information of one or more DL CCs by extending the amount of information that can be allocated to one PUCCH. It is assumed that one PUCCH includes periodic CQI information of one DL CC. In this case, if N number of PUCCHs and one PUSCH are used in one UL CC, it can mean that, when the base station requests periodic CQI information of DL CCs more than N once, periodic CQI information of N number of DL CCs is transmitted using N number of PUCCHs while periodic CQI information of DL CCs exceeding N is transmitted using the PUSCH. Alternatively, if the number of PUCCHs that can be used per UL CC by a specific mobile station is limited to M smaller than N, it can mean that periodic CQI information of M number of DL CCs is transmitted using PUCCH and periodic CQI information of DL CCs exceeding M is transmitted using PUSCH.

Figure 6:
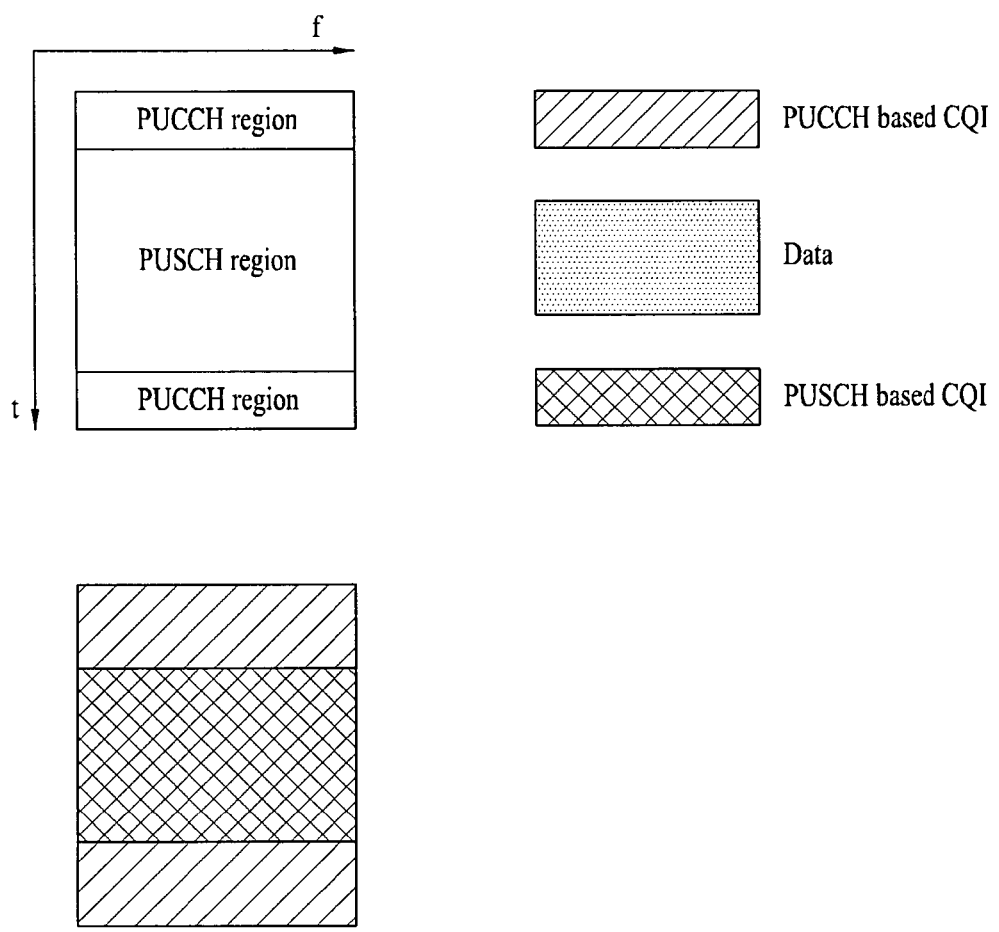
FIG. 6 is a diagram illustrating a structure of a component carrier that transmits periodic CQI information in a multicarrier system according to another embodiment of the present invention.

FIG. 6 is a diagram illustrating a structure of a component carrier that transmits periodic CQI information in a multicarrier system according to another embodiment of the present invention. As illustrated in FIG. 6, the mobile station is requested periodic CQI information from the base station, and can be allocated with PUCCH and PUSCH for periodic CQI transmission.

In this case, the requested periodic CQI information can include first channel quality information and second channel quality information. The first channel quality information can be PUCCH based CQI that can be transmitted through PUCCH and the second channel quality information can be PUSCH based CQI that can be transmitted through PUSCH. The PUCCH based CQI and the PUSCH based CQI can be divided from each other depending on the amount of information. The amount of the first channel quality information is lager than that of the second channel quality information. For example, the PUCCH based CQI could be channel quality indicator information, and the PUSCH based CQI could be a channel matrix H. Accordingly, when the requested periodic CQI information includes first channel quality information and second channel quality information, the first channel quality information can be transmitted through the PUCCH and the second channel quality information can be transmitted through the PUSCH in one UL CC.

Figure 7:
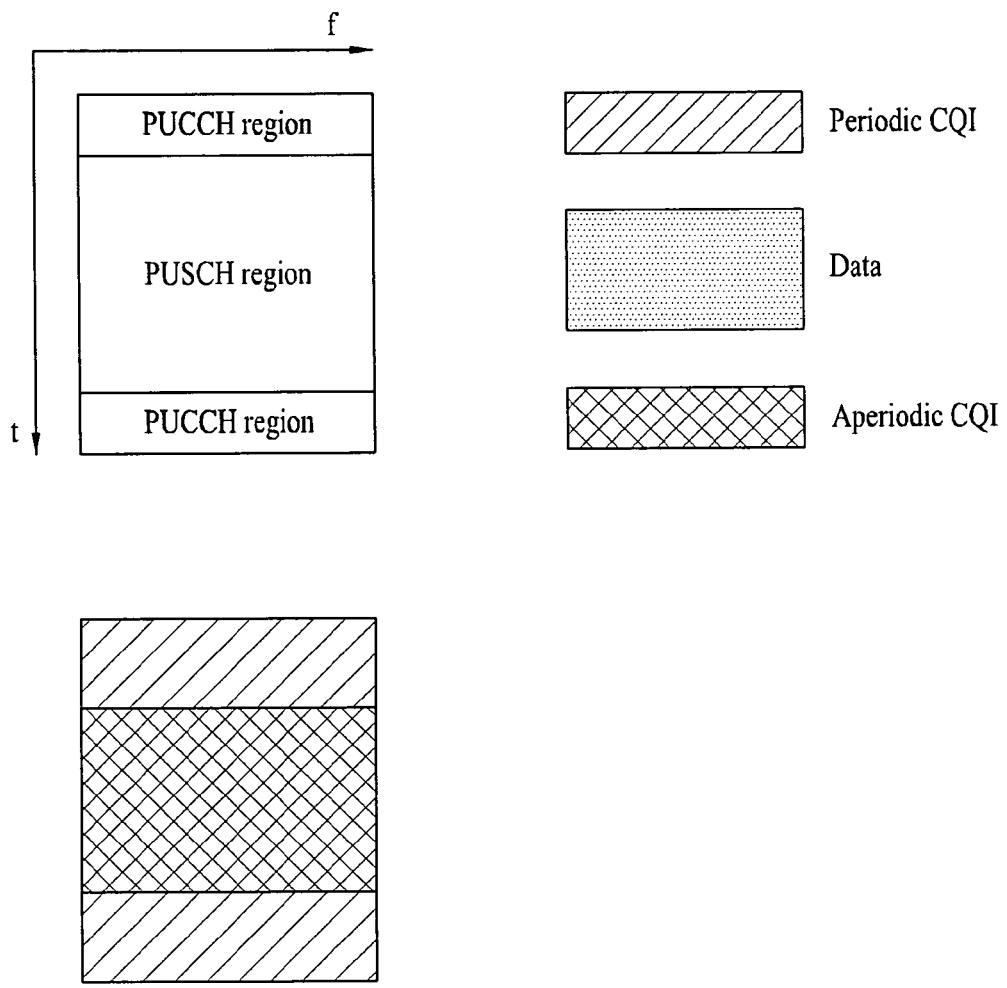
FIG. 7 is a diagram illustrating a structure of a component carrier that transmits periodic CQI information and aperiodic CQI information in a multicarrier system according to one embodiment of the present invention.

FIG. 7 is a diagram illustrating a structure of a component carrier that transmits periodic CQI information and aperiodic CQI information in a multicarrier system according to another embodiment of the present invention. As illustrated in FIG. 7, the mobile station is requested periodic CQI information from the base station, and configures PUCCH-based periodic CQI information if a PUSCH for periodic CQI transmission is not allocated thereto at the timing when the periodic CQI information should be transmitted, and transmits the configured CQI information using one or more PUCCHs. In addition, if aperiodic CQI information is requested from the base station and PUSCH for aperiodic CQI information is allocated from the base station to the mobile station, the mobile station can configure PUSCH-based aperiodic CQI information and transmit the configured aperiodic CQI information using the PUSCH.

In this case, one PUCCH includes periodic CQI information of one downlink component carrier (DL CC) to have a structure compatible with the existing LTE system, or includes periodic CQI information of one or more DL CCs by extending the amount of information that can be allocated to one PUCCH. It is assumed that one PUCCH includes periodic CQI information of one DL CC. In this case, if N number of PUCCHs and one PUSCH are used in one UL CC, it can mean that the base station requests periodic CQI information of N number of DL CCs once. If the base station requests the mobile station of aperiodic CQI of a total of DL CCs or aperiodic CQI of several DL CCs, it can mean that the CQI information can be transmitted using the PUSCH.

Figure 8:
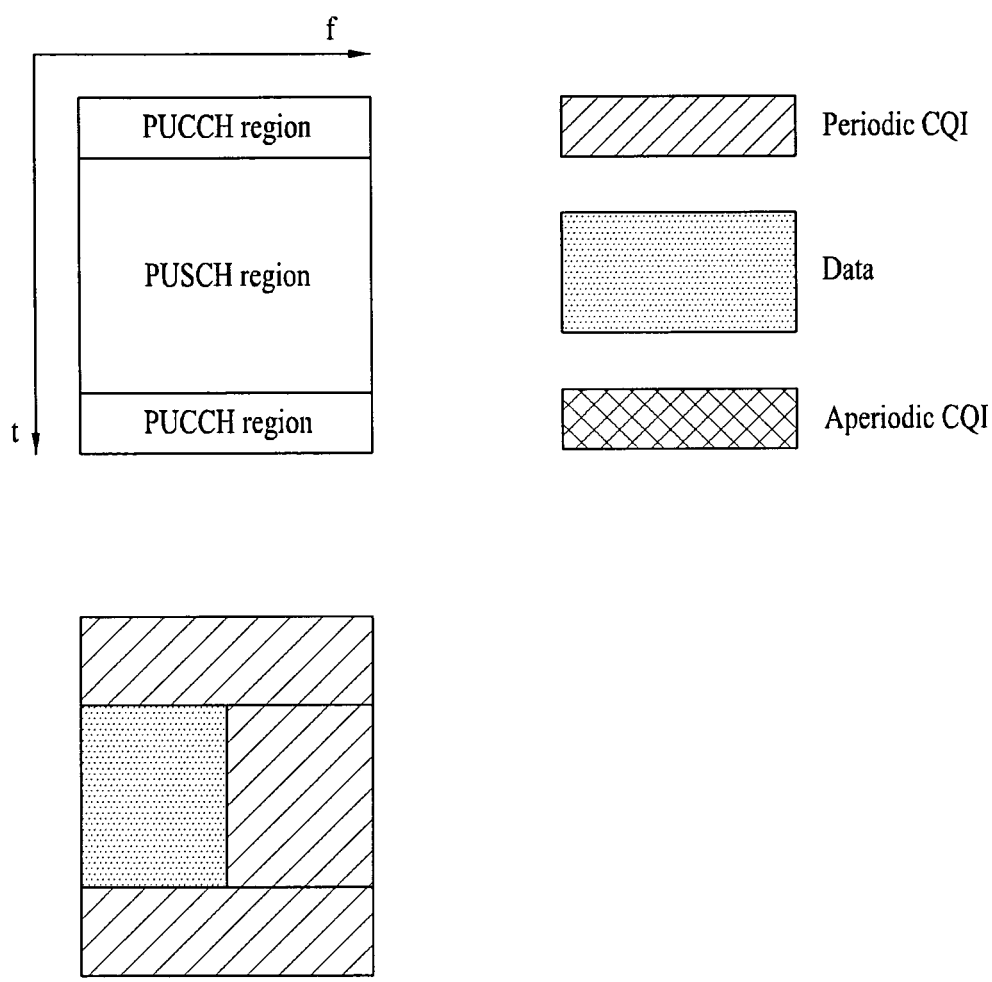
FIG. 8 is a diagram illustrating a structure of a component carrier that transmits periodic CQI information and data in a multicarrier system according to one embodiment of the present invention.

FIG. 8 is a diagram illustrating a structure of a component carrier that transmits periodic CQI information and data in a multicarrier system according to another embodiment of the present invention. As illustrated in FIG. 8, the mobile station is requested periodic CQI information from the base station, and configures PUCCH-based periodic CQI information if a PUSCH for periodic CQI transmission is not allocated thereto at the timing when the periodic CQI information should be transmitted, and transmits the configured CQI information using one or more PUCCHs. In addition, if the mobile station is requested periodic CQI information from the base station and uses a PUSCH to transmit uplink data at the timing when periodic CQI information should be transmitted, the mobile station can configure PUCCH-based periodic CQI information, multiplex the configured periodic CQI information with uplink data, and transmit the multiplexed data using the PUSCH.

In this case, one PUCCH includes periodic CQI information of one downlink component carrier (DL CC) to have a structure compatible with the existing LTE system, or includes periodic CQI information of one or more DL CCs by extending the amount of information that can be allocated to one PUCCH.

It is assumed that one PUCCH includes periodic CQI information of one DL CC. In this case, if N number of PUCCHs and one PUSCH are used in one UL CC, it can mean that, when the base station requests periodic CQI information of DL CCs more than N once, periodic CQI information of N number of DL CCs is transmitted using N number of PUCCHs while periodic CQI information of DL CCs exceeding N is transmitted using the PUSCH. Alternatively, if the number of PUCCHs that can be used per UL CC by a specific mobile station is limited to M smaller than N, it can mean that periodic CQI information of M number of DL CCs is transmitted using PUCCH and periodic CQI information of DL CCs exceeding M is transmitted using PUSCH.

Figure 9:
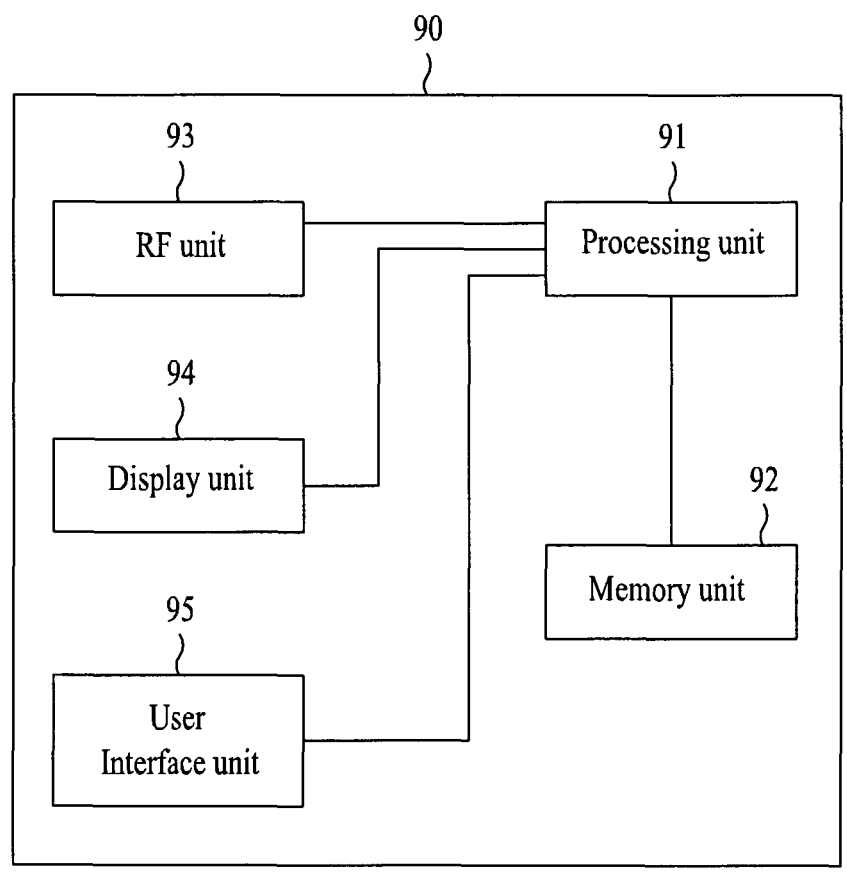
FIG. 9 is a block diagram of a device which is applicable to a UE and can implement the above-described methods.

FIG. 9 is a block diagram of a device which is applicable to a UE and can implement the above-described methods.

Referring to FIG. 9, a device 90 includes a processing unit 91, a memory unit 92, a Radio Frequency (RF) unit 93, a display unit 94, and a user interface unit 95. The processing unit 91 takes charge of physical interface protocol layers. The processing unit 91 provides a control plane and a user plane. The functionalities of each layer may be performed in the processing unit 91. The memory unit 92 is electrically connected to the processing unit and stores an operating system, application programs, and normal files. If the device 90 is a UE, the display unit 94 may display various pieces of information and may be implemented using a Liquid Crystal Display (LCD), an Organic Light Emitting Diode (OLED), or the like, which is known in the art. The user interface unit 95 may be configured in combination with a known user interface such as a keypad, a touch screen, etc. The RF unit 93 is electrically connected to the processing unit 91, for transmitting and receiving RF signals.

In the exemplary embodiments of the present invention, a description is made of a data transmission and reception relationship between a BS and a mobile terminal. In some cases, a specific operation described as performed by the BS may be performed by an upper node of the BS.

Namely, it is apparent that, in a network comprised of a plurality of network nodes including a BS, various operations performed for communication with a mobile terminal may be performed by the BS, or network nodes other than the BS. The term 'BS' may be replaced with the term 'evolved Node B (eNB)', 'fixed station', 'Node B', 'access point', etc. In the present invention, a mobile terminal corresponds to a UE. The term 'mobile terminal' may be replaced with the term 'Mobile Station (MS)', 'Subscriber Station (SS)', 'Mobile Subscriber Station' (MSS), etc. The exemplary embodiments of the present invention may be achieved by various means, for example, hardware, firmware, software, or a combination thereof. In a hardware configuration, a method for reporting a CQI in a wireless communication system according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, a method for reporting a CQI in a wireless communication system according to exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It is obvious to those skilled in the art that claims that are not explicitly cited in each other in the appended claims may be presented in combination as an exemplary embodiment of the present invention or included as a new claim by a subsequent amendment after the application is filed.

MODE FOR INVENTION

Various embodiments have been described in the best mode for carrying out the invention.

INDUSTRIAL APPLICABILITY

As apparent from the above description, embodiments of the present invention are applicable to a user equipment (UE), a base station (BS), or other devices of a wireless mobile communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of transmitting channel quality information from a mobile station in a wireless communication system, the method comprising:
   generating the channel quality information of a downlink multi carrier including N number of downlink component carriers; and
   transmitting the channel quality information to a base station through at least a physical uplink control channel (PUCCH) or a physical uplink shared channel (PUSCH) on a single uplink component carrier,
   wherein the channel quality information is periodically transmitted, and when a number of the PUCCH that are usable in the single uplink component carrier is limited to M (<N), channel quality information of the M number of the downlink component carriers is transmitted through the M number of the PUCCH and channel quality information of N-M number of the downlink component carriers is transmitted through the PUSCH.

2. The method of claim 1, further comprising multiplexing data, wherein when a time when the channel quality information is transmitted conforms to a time when the data is transmitted, the channel quality information of the M number of the downlink component carriers is transmitted through the M number of the PUCCH and the channel quality information of the N-M number of the downlink component carriers is multiplexed with the data and then transmitted through the PUSCH.

3. The method of claim 1, wherein:
   the channel quality information includes first channel quality information and second channel quality information;
   the first channel quality information is transmitted through the PUCCH and the second channel quality information is transmitted through the PUSCH; and
   an amount of the first channel quality information is larger than an amount of the second channel quality information.

4. The method of claim 3, wherein the first channel quality information comprises channel quality indicator information and the second channel quality information comprises a channel matrix H between the mobile station and the base station.

* * * * *